United States Patent [19]

Kajiura et al.

[11] Patent Number: 4,463,350

[45] Date of Patent: Jul. 31, 1984

[54] COMMUNICATION SYSTEM HAVING DESIGNATED TRANSMISSION LINES

[76] Inventors: Kōichi Kajiura, 4683, Seyamachi, Seya-Ku Yokohama-city, Kanagawa, Japan, 246; Kōzó Edanami, 88-27 Sachigaoka, Asahi-Ku Yokohama-city, Kanagawa, Japan, 241; Seiji Onoki, 12-1-308 Nishitsujidō Danchi, Tsujidō, Fujisawa-city, Kanagawa, Japan, 251; Tatsuya Izumina, 5-7-401 Zengyō Danchi, 3768-8 Fujisawa, Fujisawa-city, Kanagawa, Japan, 251; Yasuo Kumeda, 121-15 Harajukuchō, Totsuka-Ku Yokohama-city, Kanagawa, Japan, 247

[21] Appl. No.: 349,108

[22] Filed: Feb. 16, 1982

[30] Foreign Application Priority Data

Feb. 16, 1981 [JP] Japan ................................. 56-21007

[51] Int. Cl.³ ..................... H04Q 11/04; H04J 3/02; H04J 3/14
[52] U.S. Cl. ................................ 340/825.01; 370/16
[58] Field of Search ...................... 340/825.01, 825.03; 371/22; 370/85, 4, 16; 179/175.2 R

[56] References Cited

U.S. PATENT DOCUMENTS 4,228,535 10/1980 Workman et al. .................... 370/16
4,347,603 8/1982 Jacob et al. ........................... 370/85
4,347,605 8/1982 Hashizume et al. .................. 370/16
4,376,999 3/1983 Abbott et al. ......................... 370/16

*Primary Examiner*—Donald J. Yusko
*Attorney, Agent, or Firm*—E. W. Hughes

[57] ABSTRACT

A communication system is provided in which a plurality of communication devices communicate with one another over a plurality of transmission lines. One of the communication devices operates as a master station, while the remaining devices are slave stations. The master station periodically transmits transmission line specifying signals which specify or identify which of the transmission lines is to be used by the devices for communicating with one another. The master station, when operating normally, will periodically change the transmission line in use so that each of the plurality of transmission lines is used in turn and for substantially similar periods of time. At such time as any one of the slave stations detects a problem in a transmission line in use, that slave station will transmit an abnormality detected signal. The master station, in response to the receipt of such an abnormality detected signal, will transmit a transmission line specifying signal which specifies for use transmission lines other than the one which has been identified as having a problem. Thus, only transmission lines that are functioning properly are used to transmit and receive signals between communication devices of the system.

5 Claims, 5 Drawing Figures

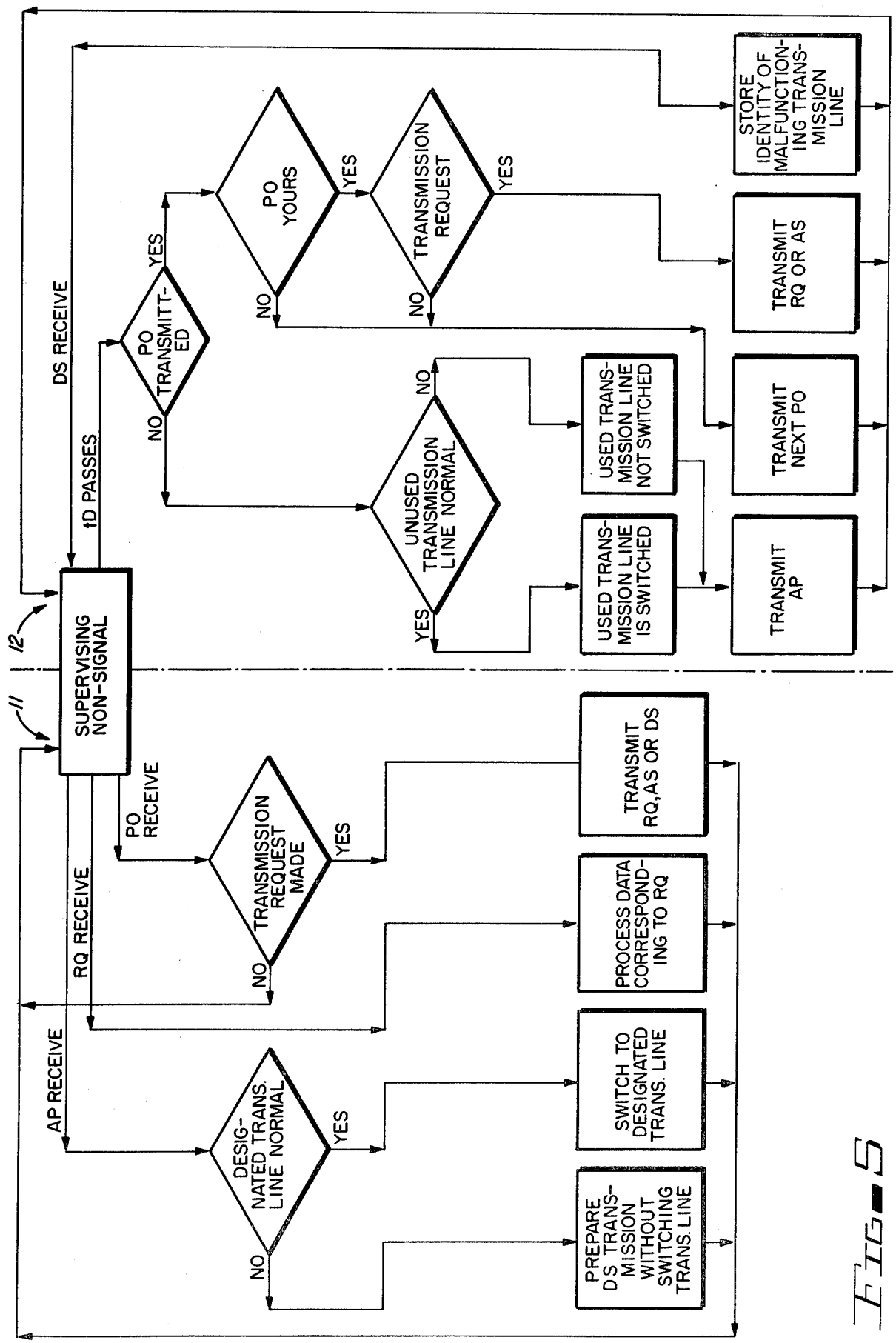

COMMUNICATION SYSTEM HAVING DESIGNATED TRANSMISSION LINES

BACKGROUND OF THE INVENTION

1. Field of the Invention. This invention relates to a communication system in which a plurality of communication devices communicates with one another through a plurality of transmission lines.

2. Description of the Prior Art. Communication systems, which include many communicating devices located in different places, and which transmit and receive information or signals using a common transmission line in a time division or multiplex manner are known. In general, such communication systems have an auxiliary transmission line in addition to a main transmission line. Typically, the main transmission line is used continuously until it malfunctions. Upon detection of such a malfunction, the system switches from the main transmission line to the auxiliary transmission line.

Thus, during normal periods of operation, the auxiliary transmission line is not used; and, therefore, there is no way of knowing that the auxiliary transmission line is capable of functioning properly. In such systems, malfunctions of the auxiliary transmission line are not detected before a malfunction occurs in the main transmission line, at which time the main transmission line is switched to the auxiliary transmission line. If the auxiliary transmission line is found defective when the main transmission line has malfunctioned, then the system fails since no messages can be transmitted from one device to another over any of the transmission lines available.

In a communication system in which a common transmission line is used in a time division manner, a predetermined communication device will function as the main, or master, station and control the use of the transmission line by the other or slave stations. Such prior art communication systems have the inherent limitation that, if the master station malfunctions, then the communication between the remaining devices ceases even if the remaining devices of the system are capable of operating normally.

BRIEF SUMMARY OF THE INVENTION

The present invention provides a communication system which includes a plurality of communication devices which are connected to one another by a plurality of transmission lines, and over which signals representing information are transmitted and received by the respective devices. One of the communication devices will operate as the master station and the others will operate as slave stations in accordance with a predetermined order of priority. The master station transmits a signal which identifies which transmission line is to be used by the devices thereafter until the next such specifying signal is transmitted. The master station when operating normally will change the transmission line or issue a signal specifying the transmission line to be used, so that the transmission line in use changes on a regular and periodic basis. Any one of the slave stations has the capability of detecting a failure of the transmission line in use by the failure to receive a transmission specification signal in an appropriate time period. When this occurs, the slave station detecting such a malfunction will transmit an abnormality signal over the other transmission line. The master station, in response to the receipt of such an abnormality signal, will thereafter only transmit transmission specifying signals which identify a transmission line other than the one which has become nonoperational so that only transmission lines with no detected problems are used by the devices of the system to communicate with one another.

It is, therefore, an object of this invention to detect any failure of an auxiliary transmission line substantially at the time such a failure occurs.

It is another object of this invention to provide a communication system in which two transmission lines are used alternately so that, if one of the transmission lines malfunctions, or becomes inoperative for any reason, the other transmission line is available for use and takes the place of the disabled line.

It is another object of this invention to provide a communication system in which the devices of the system which communicate with one another have the capability of functioning as either a master or a slave station, so that, if the master station malfunctions or is disabled, another of the communication devices becomes the master station to permit communication between the remaining properly operating communication devices.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 5 is a flow chart of the operations of the invention.

DETAILED DESCRIPTION OF THE INVENTION

Figure 1:
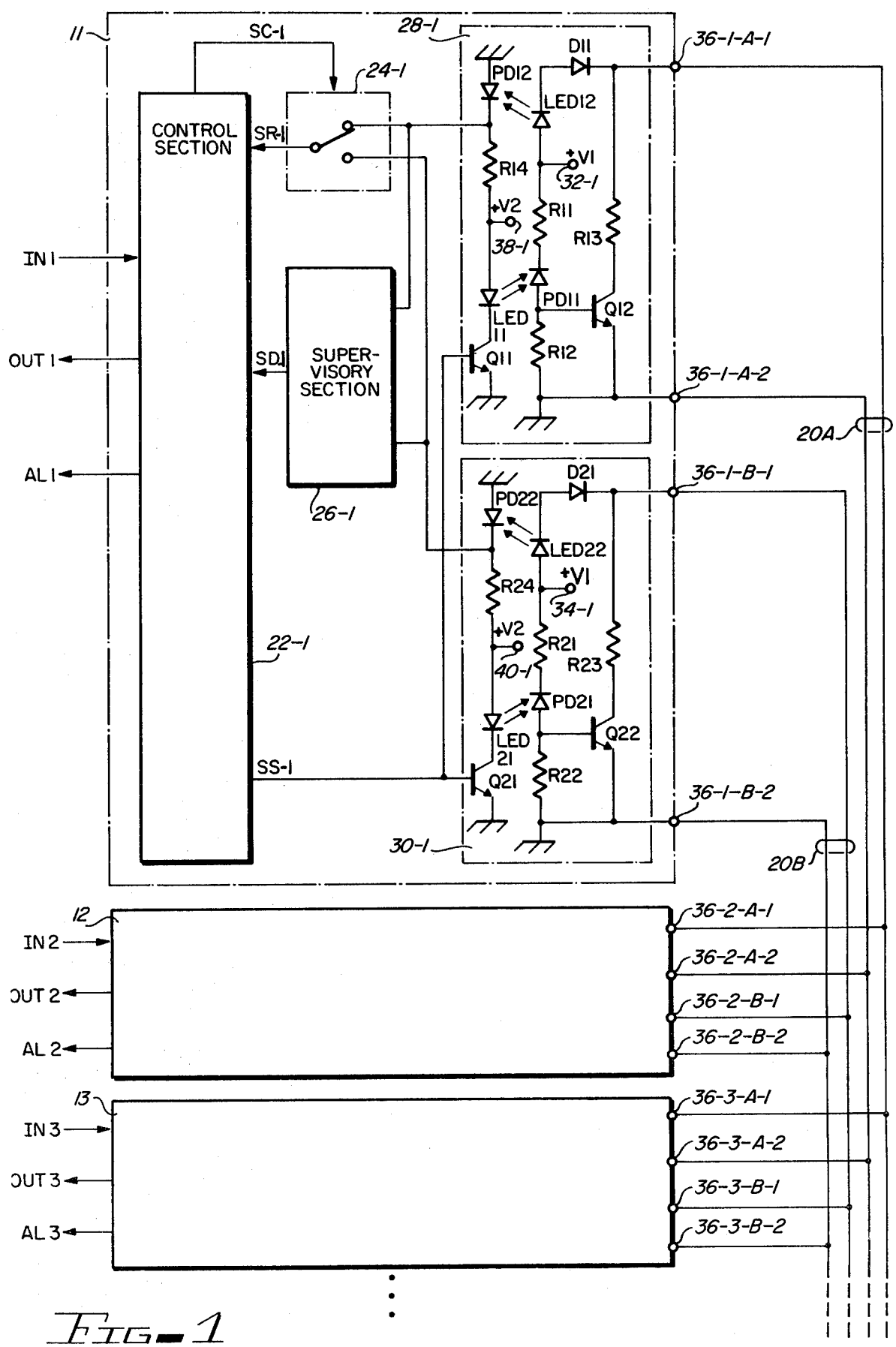
FIG. 1 is a schematic block diagram of the communication system of the invention.

FIG. 1 is a schematic block diagram of the system. A plurality of communication devices 11, 12 and 13, which are substantially identical, are connected to each other through transmission lines 20A and 20B, each of which is comprised of two conductors. Each of the communication devices 11 through 13 includes a control section, or portion, 22 which in the preferred embodiment includes a microprocessor, a switching section or circuit 24, a supervisory section, or supervisory circuit, 26 and two transmit and receive sections 28, 30. To designate corresponding parts of the three communication devices 11, 12 and 13, the reference numerals associated with communication device 11 will have the suffix 1, those associated with communication device 12 would have the suffix 2, etc.

In the transmission and receive sections 28-1 and 30-1 of communication device 11, transmission signal SS-1 controls the transistors QII and Q21 so that the light emitting diodes LED11 and LED21 emit light beams. Light from LED's 11 and 21 are received by light receiving, or photo, diodes PD11 and PD21. Depending on the variations in the impedances of these diodes PD11 and PD21, the voltages across resistors R11 and R21 vary, as well as across resistors R12 and R22, respectively, as the result of a conventional power supply having an output voltage of +V1 being connected to the power input terminals 32-1, 34-1 of communication device 11. As a result, transistors Q12 and Q22 are biased on so that the voltage levels across line terminals 36-1-A-1 and 36-1-A-2 and line terminals 36-1-B-1 and 36-1-B-2 are varied, which voltage changes, or signals, are applied to and are transmitted by transmission lines 20A, 20B. On the other hand, when signals are applied across terminals 36-1-A-1 and 36-1-A-2 and 36-1-B-1 and 36-1-B-2 from transmission lines 20A and 20B light emitting diodes LED12 and LED22 emit light as the result of electric currents flowing from the power source connected to terminals 32-1 and 34-1 through reverse current blocking diodes D11 and D21, respectively. Radiant energy from LED12 and LED22 bias on photo diodes PD12 and PD22, and the resulting variations in their impedances appear as variations of the voltage drop across resistors R14 and R24 from a power source, or power supply, having an output voltage of +V2, which power supply is connected to power input terminals 38-1 and 40-1.

The voltage variations, or received signals, produced by the light receiving diodes PD12 and PD22 are applied to the switching sections 24-1 and the supervisory section 26-1 of the communication device 11, for example. The supervisory section 26-1 includes an integrated circuit timer, a counter to monitor for the absence of received signals within predetermined supervisory time periods tD1, tD2, tD3 for each of the communication devices 11, 12 and 13, respectively. If a supervisory time period elapses and no signal is received by the device, the supervisory section 26-1, for example, of the device 11 will produce a supervisory signal SD-1. The switching section 24-1 in response to a switching signal SC-1 from the control section 22-1 selects which one of the transmission lines 20A or 20B will be connected to the control section 22-1 by switch 24-1.

Each control section 22 of a communication device 11, 12 or 13, can operate as either a master station or a slave station. If all the communication devices 10, 11 and 12 start operating at the same time, the communication device having the shortest supervisory time period tD will be the first to produce the supervisory signal SD. Thereafter, that device operates as the master station and the other, or remaining devices, operate as slave stations.

Figure 2:
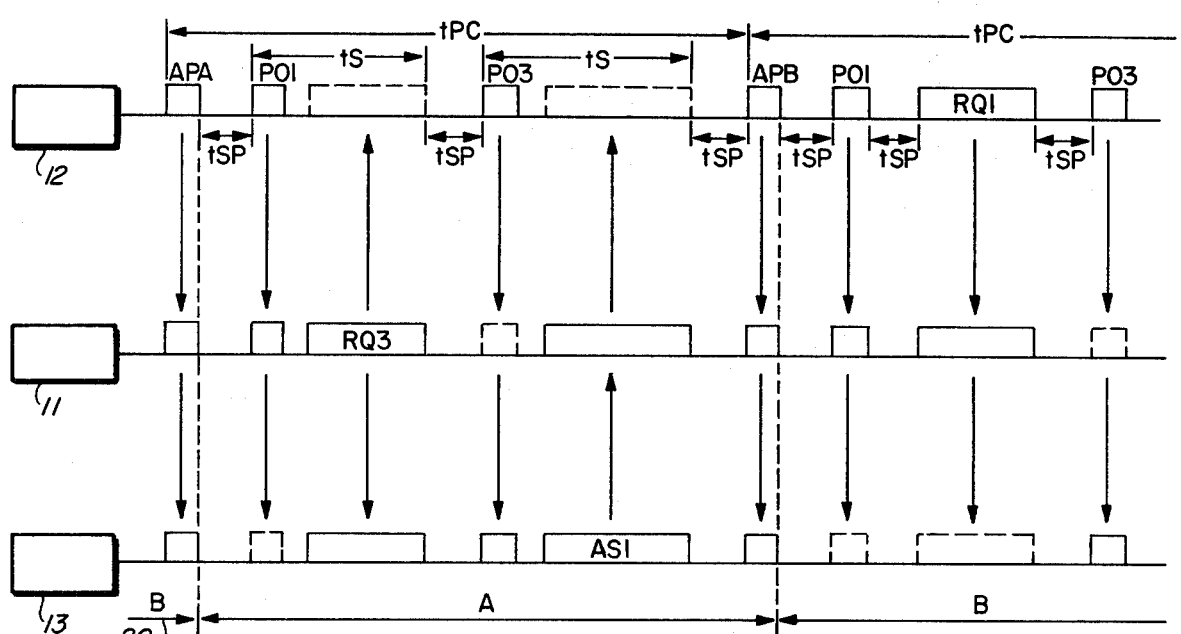
FIGS. 2 through 4 are timing charts illustrating operation of the invention.

FIG. 2 is a timing chart showing signal transmission and reception in the case where the communication device 12 operates as the master station and communication devices 11 and 13 operate as the slave stations. The master station 12 transmits specifying signals, or transmission line designation signals, APA or APB, which specify the transmission line 20A or 20B which is connected to the control section 22, respectively, alternatively during each, or cycle of operation, polling period tPC of master station 12. In response to the specifying signals APA or APB transmitted by master station 12, the switching sections 24-1 and 24-3 of slave stations 11 and 13 operate to alternately select transmission lines 20A or 20B, signals from which are applied to their respective control sections 22-1 thru 22-3. Also, master station 12 alternately selects the transmission line which is connected to its control section 22-2 immediately after the transmission of the specifying signals APA or APB.

As indicated in FIG. 2, the transmission lines 20-A and 20-B are placed in use alternately or the transmission line designated for use is, during normal operation of the system, changed at the beginning of each cycle of operation, or polling period. Polling signals PO1 and P03 which permit slave stations 11 and 13 to transmit signals, are transmitted respectively during time slots tS, which time slots are assigned respectively to stations 11 and 13. In response to the polling signal PO1, device 11 transmits a request signal RQ3 to device 13 which transmits its answer signal AS1 to device 11, all of which are transmitted and received over communication line 20A. Between each time slot tS of a polling period tPC, there occurs a space time period tSP.

In response to the polling signals PO1, the slave station 11 transmits a request signal RQ3, assuming the device 11 needs information available from device 13. The request signal RQ3 is received and interpreted by station 13 as being addressed to it. When master station 12 transmits polling signal P03, slave station 13 will transmit its answer signal AS1. The answer signal AS1 is interpreted by slave station 11 as being addressed to it, and data required by slave station 11 is accepted by the communication device 11.

In the next polling period tPC, the polling signal POI is again transmitted by device 12; however, if slave station 11 has no requests to make, or data to transmit to other devices, no signals are transmitted by station 11. Thereafter, the master station 12 can transmit after a time period tSP has elapsed a request signal RQI addressed to device 11, which request is followed after another space time period tSP has elapsed by the polling signal P03.

The stations 11 and 13 which have received the request signals RQ1 and RQ3 process the requests which are applied to their respective control sections 22-1 and 22-3 of devices 11 and 13. According to the contents of the request signals, each transmits answer signals AS1 and AS3 addressed to the device having made a request for information by means of the transmission line 20 in use.

The request signals RQ1 and RQ3 and the answer signals AS1 and AS3 include codes to indicate the addressed devices and binary signals representing the information requested by the requesting devices.

Figure 3:
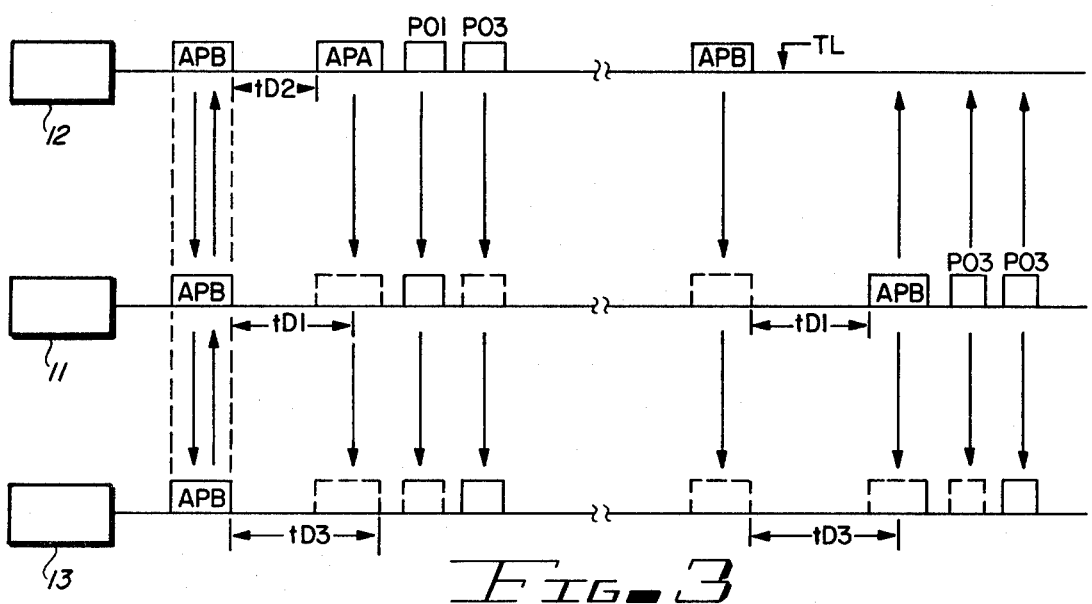

FIG. 3 is a time chart showing the supervisory times tDI, tD2, and tD3 of the supervisory sections 26-1, 26-2, and 26-3 of the communication devices 11, 12 and 13 illustrated in FIG. 1 and how the communication devices, or stations, determine which communication is to function as the master station. It is assumed that because of differences in start times of the stations which may occur when power is switched off and then turned on that all the stations 11-13, for example, decide to act essentially simultaneously as the master station, and transmit the specifying signals at the same time, such as APB. In this case, the stations 11-13 receive signals, variations of voltage levels on transmission lines 20A or 20B, not only those caused by the signals each transmits, but also as a result of the signals received from the other devices. Therefore, the control sections 22-1, 22-2, and 22-3 sense that all of the stations, or devices, are trying to become the master station, and each stops its signal transmission essentially simultaneously.

Accordingly, no specifying signals APA or APB are received. Each supervisory section 26-1, 26-2, 26-3 is then enabled to produce its supervisory signal SD-1, SD-2, SD-3 at the end of the supervisory time period, and in response to the supervisory signals SD-1, SD-2, and SD-3 the control sections 22-1, 22-2, and 22-3 are enabled to transmit the specifying signal APA or APB. However, since the supervisory time periods TD1 through TD3 of the stations 11 through 13 are different, station 12 which has the shortest supervisory time period TD2 starts transmission first and will function thereafter as the master station. As a result, stations 11 and 13 become slave stations. In response to the specifying signal APA from the master station 12, the slave stations 11 and 13 select transmission line 20A and carry out operations in response to the polling signals PO1, P03, as described above.

FIG. 3 further illustrates a situation in which master station 12 malfunctions, or becomes inoperative for any reason. When this situation occurs, slave station 11, for example, will become the master station. If a malfunction TL occurs in the master station 12 after the specifying signal APB has been transmitted, slave station 11 decides after the lapse of its supervisory time period tDI during which it has received no transmission from station 12 that it should become the master station and transmits the specifying signal APB and the polling signals P02 and P03. Thus, communication is continued between stations TI and T3 which are operating normally.

Only three stations 11 through 13 are illustrated in FIG. 1; however, in practice, up to ten communication devices can be used in a system. Among these devices typically eight are constructed so as to function as either a master or a slave station and each is provided with a different supervisory time period tD-1,n. When, as described above, several devices contend to be the master station, or the master station malfunctions, the station having the shortest supervisory time period among the stations still operating normally, or properly, will become the master station. As a result, communication between such properly functioning stations continues until the number of stations which are functioning properly becomes less than two.

Figure 4:
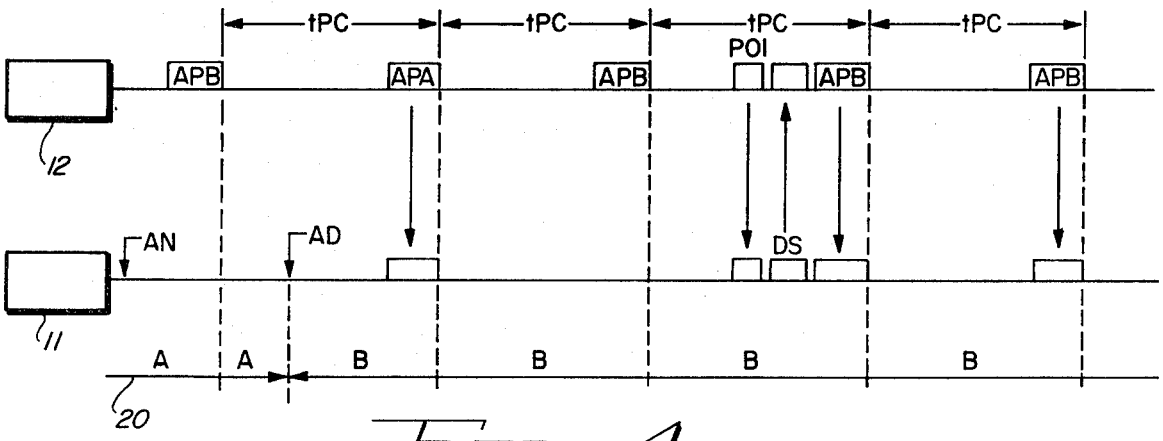

FIG. 4 is a timing chart which illustrates the specification of transmission line 20B as the transmission line to be used when transmission line 20A malfunctions. When a malfunction AN occurs in transmission line 20A during use of the latter, slave station 11 or 13, with 13 not being illustrated, recognizes this from the failure to receive the transmission line specification signal APB during the time interval tPC, and its supervisory section 26-1 recognizes such an abnormal condition and produces the abnormal condition signal AD. Immediately after the detection of the condition AN, slave station 11 causes its switching section 24-1 to select transmission line 20B so that the slave stations are ready to receive signals from transmission line 20B.

As the polling period tPC passes, master station 12 transmits transmission line specifying signal APB and switches to transmission line 20B. When, thereafter, master station 12 transmits polling signal PO1 which is received by the slave station 11, slave station 11 transmits an abnormality signal DS which includes data or information which indicates the occurrence of the abnormality in transmission line 20A. This information is received by master station 12 and is stored in control section 22-2.

When the abnormality signal DS is received by master station 12, its control section 22-2 recognizes that a malfunction has occurred in transmission line 20A. Thereafter, master station 12 transmits only transmission line specifying signal APB which specifies that transmission line 20B is to be used thereafter until the abnormal condition of line 20A is corrected, and sets its switching section 24-2 to connect transmission line 20B to its control section 22-2. Thereafter, communication is continued with only transmission line 20B being used.

Upon reception of the abnormality signal DS, the master station 12 also produces an alarm output AL2, as illustrated in FIG. 1, which can be used to energize a display lamp or a buzzer to give an appropriate alarm signal. The occurrence of a malfunction in the master station is also detected by the slave stations so that alarm outputs AL1 and AL3 are also produced by the slave stations 11 and 13.

FIG. 5 is a flow chart of the above-described operations. In master station 12 if the answer to the question "Is the polling signal PO transmitted?" is "Yes" before the supervisory time period tD passes, then an answer is made to the question "Is the polling order yours?". If the answer is "Yes", then an answer is made to the question "Does your station have a transmission request?". If the answer is "Yes", the master station "transmits the request signal RQ or the answer signal AS". If the answer is "No", then the master station transmits the polling signal PO for the next device. If the answer to the question "Is the polling order yours?" is "No", the master station transmits the polling signal "PO of the next device".

If the answer to the question "Is the polling signal transmitted?" is "No", an answer is made to the question "Is the alternate transmission line normal?" which is determined by the presence or absence of an abnormality signal DS. If the answer is "YES", an instruction to cause "The using transmission line to be switched" is executed, and the specifying signal "AP is transmitted" according to the instruction. If the answer is "No", an instruction to cause the using transmission line not to be switched is executed, and the specifying signal "AP" is transmitted accordingly. In response to the reception of an abnormality signal "DS", the transmission line malfunction data is stored, which data provides an answer to the question "Is the transmission line not being used normal?".

On the other hand, in the slave stations 11 or 13 in response to the reception of the specifying signal "AP", an answer is made to the question "Is the specified transmission line normal?". If the answer is "Yes", the transmission line used by the slave station is switched to the specified transmission line. If the answer is "No", the transmission line is not switched, and the slave device performs the function "DS transmission preparation, etc."

Upon "reception of the polling signal PO", an answer is made to the question "Is there a transmission request?". If the answer is "Yes", the request signal "RQ", the answer signal "AS", or the abnormality signal "DS", is transmitted. Upon reception of the request signal "RQ", the slave station responds to the request normally by preparing an answer "AS".

As is apparent from the above description, the transmission lines 20A and 20B are used alternately as long as each is functioning normally. If one of the transmission lines is not operating properly, or malfunctions, then an alarm is immediately given and communication is continued using the normally functioning transmission line. When a malfunction occurs in the master station, one of the slave stations, the one with the shortest supervisory time period tD, becomes the master station until the number of stations which can function as a master station is reduced to less than two. Furthermore, an alarm is produced by each device if the master station malfunctions or is not working properly. Thus, the communication control system of the invention has a very high degree of reliability, which greatly reduces maintenance problems.

The arrangements of the communication devices 11 through 13, as illustrated in FIG. 1, and the relationships between the master station 12 and the slave stations 11 and 13, illustrated in FIGS. 2 through 5, can be varied according to conditions as required. The sequences of operations as illustrated in FIG. 5 also can be modified to satisfy required conditions; i.e., the invention can be modified.

As is apparent from the above description, the communication system in which a plurality of communication devices are connected by a plurality of transmission lines so that signals are transmitted therebetween greatly improves the reliability of the system. The communication system of this invention is very effective for transmitting and receiving the data, particularly that which must be communicated between industrial measuring and control equipment.

We claim:

1. In a communication system in which "n" communication devices communicate over "a" transmission lines where "n" and "a" are integers greater than 0, each of said communication devices including transmitting means for transmitting binary-coded information simultaneously over each of the transmission lines, each of said communication devices having receiving means for receiving signals from any one of said transmission lines, one of said communication devices being the master device and the remaining (n−1) devices being designated as slave devices, the master device executing repetitively a cycle of operation, the master device during each cycle of operation transmitting a polling signal addressed to a different one of the slave communication devices until a polling signal addressed to each slave device is transmitted, each slave device upon the receipt of a polling signal addressed to it transmitting a request for data to other devices identified in its request, or transmitting an answer to a requesting device in response to a request addressed to it, or not transmitting if it does not have a request, an answer, or anything else to transmit;

the improvements comprising:
the master device beginning each of its cycles of operation by transmitting a transmission line designation signal addressed to all devices, the receipt of which causes each of the devices receiving the transmission line designation signal to receive signals only from the designated transmission line; the master device upon completion of one duty cycle initiating a succeeding duty cycle by transmitting at the beginning of said succeeding duty cycle a transmission line designation signal designating a transmission line other than that designated during the immediately preceding duty cycle.

2. The communication system as defined in claim 1 in which a=2.

3. In a communication system as defined in claim 2 in which each slave device, if it fails to receive any signals during a duty cycle, will in the next duty cycle in which it is polled by the master device, transmit a signal to the master device that the transmission line designated for use during the previous duty cycle was not functioning and identifying the nonfunctioning transmission line, said master device thereafter not designating the nonfunctioning transmission line for use.

4. In a communication system in which "n" communication devices communicate over two parallel transmission lines where "n" is an integer greater than 0, each of said communication devices having means for transmitting information simultaneously over each of the transmission lines and means for receiving signal from only one of said lines, one of said communication devices being designated as the master device and the remaining devices being designated as slave devices, the master device having a polling period during which the master transmits a polling signal addressed to each of the slave communication devices in turn, each polling period lasting until each of the slave devices of the system has been polled, each slave device upon receipt of a polling signal being enabled to transmit a request for data from other devices identified in the request, to transmit an answer in response to a received request addressed to the device making the request, or not to transmit if it has no information to transmit;

the improvements comprising:
the master device beginning each polling period by transmitting a transmission line designation signal, the receipt of which causes each of the slave devices to receive signals thereafter only from the designated transmission line; the master device upon the completion of one polling period initiating another polling period by transmitting a transmission line designation signal designating a transmission line other than that designated during the immediately preceding polling period.

5. The communication system as defined in claim 4 in which n=8.

* * * * *